United States Patent Office
2,917,476
Patented Dec. 15, 1959

2,917,476

LATEX-BASED INTUMESCENT COATING COMPOSITIONS CONTAINING SOLID PLASTICIZERS

Norman R. Peterson and Ira J. Cummings, Midland, Mich., assignors to The Dow Chemical Company, Midland, Mich., a corporation of Delaware No Drawing. Application April 2, 1956
Serial No. 575,368

2 Claims. (Cl. 260—17.4)

This invention relates to an improved intumescent coating composition and a wall member, such as fiber board, coated therewith. More particularly it relates to improved plasticizers for such coatings.

Intumescent coating compositions have been applied in the past to combustible materials for protection against fire. Some of those compositions are disclosed in U.S. Patents 2,452,054, 2,523,626, and 2,566,964 all of which teach the preparation of such coating compositions depending on formaldehyde, or some other reactive material to form a resin which may serve as a binding agent for the intumescent reagents. Other compositions based on a polymeric latex binder are disclosed in the copending application of which one of the present inventors is a co-inventor, U.S. Serial No. 354,676, filed May 13, 1953 now issued into U.S. 2,755,260, dated July 17, 1956. Some of the disclosed and useful latexes are film-forming with air drying only when the polymer in the latex is in plasticized condition. Film-forming ability is desirable to form a coherent continuous coating which may be applied to a structural member, such as fiber board. The plasticizers which have been found applicable for use in the disclosed latexes have consisted of certain liquid organic compounds. To achieve the uniform plasticization necessary for coating operations, it has been found to be mandatory that the plasticizer be added to the polymer latex in the form of a separate aqueous emulsion. The preparation of such plasticizer emulsions constitutes an added procedural step requiring extra equipment and man-power. It would be advantageous economically if such a procedural step could be omitted.

Additionally, it has been found that those plasticizers which have a slight solvating, swelling, or plasticizing action on the polymer at room temperature seriously reduce the mechanical stability of the latex. Thus, when the solid intumescent ingredients are added to the latex, great care must be exercised to keep the mechanical forces involved in the mixing very low to prevent premature coagulation. It would be desirable to have compositions having greater stability than has been heretofore possible.

It is accordingly the principal object of this invention to provide improved plasticized latex based coating compositions.

It is a further object to provide improved plasticizers for such compositions.

It is a still further object to provide plasticizers for such compositions that may be added directly to the compositions without seriously reducing the mechanical stability of the compositions.

The above and related objects are accomplished by means of intumescent coating compositions comprising from 40 to 60 percent aqueous dispersion of a mixture consisting of non-film-forming intumescent solids and an aqueous latex like polymer dispersion plasticized with a solid plasticizer having no plasticizing action on the polymer at low temperatures, but actively plasticizing the polymer at elevated temperatures. The non-film-forming intumescent solids consist of a foam forming substance or spumific, a non-resinous carbon yielding substance or carbonific, and an organic nitrogen compound, all as described in the prior art.

Materials suitable as non-resinous carbonifics are carbohydrates, modified starches and similar substances, a water dispersible protein such as gelatin or casein, or a polyhydric compound from the class consisting of the hexitols, such as mannitol, the pentitols such as arabitol, or the mono-, or di-tetritols such as mono and di-pentaerythritol. It is also possible to use a mixture of two or more of the above-mentioned products. It is preferred to use pentaerythritol or the dimer of pentaerythritol, or mixtures of the two for the non-resinous carbonific. Commonly the commercial grades of monopentaerythritol contain minor amounts of the dimer. In the instant compositions the amount of any starch employed should be less than 15% by weight of the foam forming substance.

While an organic nitrogen compound is not entirely essential, improved intumescence is obtained from a composition containing one. Amino compounds such as dicyandiamide, urea, dimethyl urea, guanylurea phosphate, and glycine are suitable organic nitrogen compounds. Of these, urea or dicyandiamide are preferred as the organic nitrogen compound.

At temperatures at or near the temperature of combustion of wood, the non-resinous carbonific and organic nitrogen compound in combination with a foam-producing agent, or spumific, forms a fire resistant carbonaceous foam. The spumifics that may be used in this invention are preferably monoammonium phosphate, diammonium phosphate, phosphoric acid, ammonium sulfate, sulfamic acid, ammonium sulfamate, ammonium bromide, sodium tungstate, or sodium borate.

The carbonific may be present in amounts of from 10 to 70 percent of the weight of the spumific, and preferably 35 to 45 percent. The organic nitrogen compound may be present in amounts of from 0 to 55 percent of the weight of the spumific, but the preferred range is 5 to 20 percent.

Such compositions, when employed without further modification lack resistance to abrasion. Therefore, a polymer latex, usually of about 50 percent solids, is incorporated into the coating composition as a binder, so that the amount of the latex solids in the composition is from 5 to 35 percent of the total solids, but preferably from 15 to 30 percent. Any aqueous film-forming latex of a polymer may be employed. By film-forming is meant the ability to form films by air drying a deposited coating or by coalescing or agglomerating the polymer latex with subsequent fusion. Examples of such film forming latexes are the polymer of vinyl chloride, and copolymers of vinyl chloride and other vinyl esters, the copolymers of styrene and butadiene, vinylidene chloride and acrylonitrile, and vinylidene chloride and vinyl chloride. The last three are preferred, as they give the greatest scrub resistance to the compositions.

The latex may be prepared by any of the known procedures for polymerization in aqueous emulsion. Typically the monomer or comonomers are added to an aqueous solution of a water soluble polymerization catalyst, such as potassium persulfate or hydrogen peroxide, and a surface active agent capable of maintaining the monomer in emulsion. Many suitable surface active agents are known to the art. The polymerizable mixture is agitated to effect emulsification and polymerization is initiated by heating the emulsified mixture usually between 35° C. to 100° C. The surface active agent is usually employed in an amount corresponding to from 0.5 to 5 percent of the weight of the polymerizable compounds. It is common practice when the polymerized latexes are to be stored for prolonged periods to add an additional amount of surface active agent to impart added shelf stability. The polymerization catalyst is usually added in an amount corresponding to from 0.5 to 5 percent of the weight of the monomer. Following polymerization, the resulting latex is filtered to remove any precoagulum and may be demonomerized by known methods such as steam stripping. For film forming purposes it has been found that polymer latexes should have at least 25 percent of evaporative solids and preferably have at least 40 percent.

As is known in the art, some latexes will form films of unplasticized polymers, while others require a plasticizer to be film forming. Even with those latexes which are film forming in unplasticized condition a plasticizer is frequently employed to provide certain special properties such as increased flexibility. The prior plasticizers which have been employed in latexes have been liquids having plasticizing action on the polymer at about room temperature. Those plasticizers seriously reduced the mechanical stability of the plasticized latex and consequently were difficult to stir directly into the latex. It has been the practice to prepare an emulsion of the plasticizer in water which was subsequently stirred into the latex. Such separate emulsions require an extra procedural step necessitating extra equipment and manpower and in addition lower the solids content of the latex and add unnecessarily more wetting agent to the plasticized latex. It has now been found that certain solid plasticizers may be added to the coating composition and treated as an inert solid. It is only necessary that the solid plasticizer be non-solvating at room temperature and have a congealing point above room temperature and below a temperature at which the polymer will be degraded. Preferably these temperatures will be from about 75° C. to 125° C. Typical examples of such solid plasticizers are solid chlorinated paraffins, such as Chlorowax 70S sold by The Diamond Alkali Company, diphenyl phthalate, tris (p-tert-butylphenyl) phosphate sold by the Dow Chemical Company as Plasticizer 77, p-toluene sulfonamide and triphenyl phosphate. With some of the plasticizers such as triphenyl phosphate it may be desirable to add a small amount of additional surface active agent to the composition to impart mechanical stability.

The solid plasticizers of this invention may be used in an amount of from 5 to 50 percent, preferably 5 to 25 percent, of the weight of the polymer solids and will usually not render film forming a normally non-film-forming polymer latex. Greater than 50 percent of plasticizer seriously detracts from the desirable properties of the polymer.

It is a common practice in the polymer latex art to add a small amount of a thickening agent to the latex to enhance the film-forming characteristics. Such thickening agents are usually hydrophilic colloids such as low viscosity methyl cellulose or sodium alginate.

In preparing the new coating compositions, the various inert ingredients are initially mixed and ground together for several hours in a pebble mill, adding sufficient water to form a slip of about 50 percent solids content. By inert ingredients are meant those materials such as suspending agents, fillers, pigments dyes, and fungicides or bactericides which may be desired in the coating for an effect such as color or mildew proofing not associated with the flame resistant characteristics of the coating. Examples of suitable suspending agents are gum tragacanth, gum arabic, Irish moss, and the like. Suitable well-known substances to counteract the fermentation of the carbohydrate or protein carbonific and the growth of fungi are sodium pentachlorophenolate, beta naphthol, copper fluoride, or other copper salts, boric acid, borax, zinc salts, fluorides, arsenates, arsenites, and the like. The useful fillers, pigments, and dyes will depend on the effect or color desired and are well-known in the art.

The solid plasticizers of this invention may be treated as an inert solid and added to the above mixture of inert ingredients prior to milling the slip. This represents a substantial departure from prior methods employing liquid plasticizers wherein the plasticizer had to be incorporated into the latex. To the pigment slip so formed from the inert ingredients and plasticizer may be added the spumific and carbonific. The desired latex is finally stirred in for a short time. A smooth composition results, containing about 50 percent solids, and having the stability of the unmodified latex. The stability remains with the composition until the temperature of the composition is raised above the congealing temperature of the plasticizer. When using liquid plasticizers and the prior plasticizing methods it was never possible to attain stability equal to that of the unmodified latex. The plasticizers exert their plasticizing action on the polymer during the curing step after the mechanical stability of the composition is no longer important.

The new coating compositions, prepared in accordance with this invention, may be applied to any combustible building material to impart fire retardant properties thereto and to provide the material with a washable coating. The new compositions may be applied by roller, brush, or spray application. When the coating is applied at the mill where the fiberboard or other material is made, the coated article is usually dried by a heat treatment, or curing step, at a temperature of about 50° C. to 200° C., preferably at 75° to 125° C. A coated board prepared in this manner is fire retardant and its coating is substantially resistant to the abrasion encountered in normal use or in washing operations.

The compositions preferably consist of the amounts of materials previously described and of the kinds described in copending U.S. application Serial No. 354,676, filed May 13, 1953. When more spumific than the stated amount is used, the walls of the heat generated foam are fractured by excessive gassing. When the amount of non-resinous carbonific is more than the stated amount, insufficient spumific is present to form the deep foam needed for insulating the combustible coated material. When an excess of organic nitrogen compound is present, the degree of intumescence is again too low. When less than the disclosed amount of latex solids is in the composition a coherent, continuous coating does not result, and the coating is not wash-resistant.

By way of example, several intumescent coating compositions were prepared by milling mixtures of 56 parts by weight monoammonium phosphate, 10 parts by weight of dicyandiamide, 22 parts by weight of pentaerythritol, 12 parts by weight of titanium dioxide, 5 parts of a plasticizer from those listed below, 1.25 parts of an anionic wetting agent, and 47 parts of water on a high speed colloid mill. The plasticizers used were a liquid alkyl aryl phosphate for comparative purposes and triphenyl phosphate, diphenyl phthalate, a chlorinated paraffin having 70 percent chlorine, tris-(p-tert-butyl phenyl) phosphate and p-toluene sulfonamide. To the resultant pigment slip was added, with agitation, 40 parts (solids basis) of a latex prepared by the emulsion polymerization of comonomers consisting of 25 percent by weight of vinylidene chloride and 75 percent by weight of vinyl chloride, said latex having 55 percent evaporative solids.

The shelf life of the compositions was measured by means of a Brookfield viscometer at 60 r.p.m. It was found that the composition using the liquid alkyl aryl phosphate reached a viscosity of 10,000 cps. in less than 12 hours. The composition using triphenyl phosphate reached a viscosity of 10,000 cps. in 14 days; that using tris-(p-t-butyl phenyl) phosphate reached 10,000 cps. in 16 days; that using diphenyl phthalate leveled off at a viscosity of 900 cps. in 17 days; and the composition using the chlorinated paraffin leveled off at 375 cps. in 14 days. For comparative purposes an unplasticized composition leveled off at 450 cps. in 13 days but coatings made from the unplasticized composition were inferior, especially in their washability or scrub resistance. The compositions of this invention have about the same stability as that of the unplasticized composition, but are much more useful.

As a further illustration of the advantages of these coatings the coating compositions prepared above were subjected to high speed agitation for 30 minutes. The coating having the liquid alkyl aryl phosphate plasticizer was completely coagulated. That coating composition using tris(p-tert-butyl phenyl) phosphate had 5 percent coagulation. The composition having diphenyl phthalate had 2 percent coagulation. All the others had no coagulation. The coagulation was determined by filtering the latex following agitation and weighing the coagulum.

To illustrate the effect of curing on the above samples, the wall boards coated with the composition using triphenyl phosphate were cured at four temperatures. The samples were tested for scrub resistance using a 0.5 percent soap solution and the "Gardner Straight Line Scrub Tester Model 105" (obtained from Gardner Laboratory Inc., Bethesda, Maryland). The coating cured at 70° C. failed after 50 cycles; at 80° C. it failed at 300 cycles, at 90° C. it failed at 900 cycles; and at 100° C. it failed at 1500 cycles. The last three are considered excellent.

Similar results were obtained when latexes of polyvinyl chloride, copolymers of vinyl chloride and vinyl acetate, vinylidene chloride and acrylonitrile, and styrene and butadiene were employed.

We claim:

1. An intumescent coating composition having improved mechanical stability comprising a 40 to 60 percent by weight aqueous dispersion of a mixture consisting of 70 to 85 percent by weight of said mixture of non-film forming intumescent solids and enough of an aqueous latex of a polymer selected from the group consisting of the homopolymer of vinyl chloride, copolymers of vinyl chloride and vinyl acetate, copolymers of vinylidene chloride and vinyl chloride, copolymers of vinylidene chloride and acrylonitrile, and copolymers of styrene and butadiene, said polymer being plasticized with from 5 to 50 percent by weight based on the weight of the polymeric solids of said latex of a solid plasticizer having a congealing temperature above room temperature and below the temperature at which the polymer is degraded said solid plasticizer selected from the group consisting of solid chlorinated paraffins, diphenyl phthalate, tris(p-t-butylphenyl) phosphate, p-toluene sulfonamide, and triphenyl phosphate to provide correspondingly from 30 to 15 percent by weight of polymer solids said intumescent solids consisting essentially of (1) a foam forming ingredient selected from the group consisting of monoammonium phosphate, diammonium phosphate, phosphoric acid, ammonium sulfate, sulfamic acid, ammonium sulfamate, ammonium bromide, sodium tungstate, and sodium borate; (2) from 10 to 70 percent, based on the weight of the foam forming ingredient, of at least one polyhydric compound from the class consisting of starch, the hexitols, pentitols, and the mono- and di-tetritols the amount of any starch employed being less than 15 percent by weight of said foam forming ingredient; and (3) not more than 55 percent, based on the weight of the foam forming ingredient, of an amino compound from the group consisting of glycine, urea, dimethyl urea, guanyl urea, guanidine, and dicyandiamide.

2. The composition claimed in claim 1 wherein said solid plasticizer has a congealing temperature of from 75° C. to 125° C.

References Cited in the file of this patent

UNITED STATES PATENTS

| | | |
|---|---|---|
| 2,385,879 | Patton | Oct. 2, 1945 |
| 2,449,684 | Bacon et al. | Sept. 21, 1948 |
| 2,462,029 | Perry | Feb. 15, 1949 |
| 2,575,553 | Kolvoort | Nov. 20, 1951 |
| 2,613,191 | McGaffin | Oct. 7, 1952 |
| 2,616,418 | Eberl | Nov. 4, 1952 |
| 2,684,953 | Stilbert | July 27, 1954 |
| 2,689,836 | Bier | Sept. 21, 1954 |
| 2,721,145 | Cheronis | Oct. 18, 1955 |
| 2,755,260 | Stilbert et al. | July 17, 1956 |